(12) United States Patent
Golder

(10) Patent No.: US 6,946,955 B2
(45) Date of Patent: Sep. 20, 2005

(54) INITIAL MOVEMENT INDICATOR SYSTEM AND METHOD FOR A WHEELED GROUND VEHICLE

(76) Inventor: Thomas J. Golder, 4200 Denbigh Dr., Charlotte, NC (US) 28226

( * ) Notice: Subject to any disclaimer, the term of this patent is extended or adjusted under 35 U.S.C. 154(b) by 59 days.

(21) Appl. No.: 10/762,385

(22) Filed: Jan. 21, 2004

(65) Prior Publication Data

US 2005/0156727 A1 Jul. 21, 2005

(51) Int. Cl.[7] ................................................ B60Q 1/50
(52) U.S. Cl. ....................................... 340/467; 340/464
(58) Field of Search ............................... 340/467, 464, 340/463, 466, 479

(56) References Cited

U.S. PATENT DOCUMENTS

| | | | |
|---|---|---|---|
| 1,184,090 A | 5/1916 | Frerks | |
| 1,269,246 A | 6/1918 | Anello et al. | |
| 2,810,899 A | 10/1957 | Foster | |
| 3,252,136 A | 5/1966 | Bartens | |
| 3,273,117 A | 9/1966 | Martauz | |
| 3,281,786 A | 10/1966 | Leichsenring | |
| 3,364,384 A | 1/1968 | Dankert | |
| 3,462,773 A | 8/1969 | Boya et al. | |
| 3,497,871 A | 2/1970 | Damico | |
| 3,601,794 A * | 8/1971 | Blomenkamp et al. | 340/464 |
| 3,711,828 A * | 1/1973 | Hawkins | 340/464 |
| 3,760,353 A | 9/1973 | Hassinger | |
| 4,171,030 A | 10/1979 | Ruhl | |
| 4,470,036 A | 9/1984 | Doerr et al. | |
| 4,800,377 A | 1/1989 | Slade | |
| 4,841,276 A | 6/1989 | Abel et al. | |
| 4,946,296 A | 8/1990 | Olschewski et al. | |
| 4,952,909 A | 8/1990 | Woerner et al. | |
| 4,968,156 A | 11/1990 | Hajzler | |
| 5,164,701 A | 11/1992 | Nan-Mu et al. | |
| 5,231,373 A | 7/1993 | Freeman et al. | |
| 5,481,243 A | 1/1996 | Lurie et al. | |
| 5,564,839 A | 10/1996 | Ouchi et al. | |
| 5,682,137 A | 10/1997 | Li | |
| 5,757,949 A | 5/1998 | Kinoshita et al. | |
| 5,805,060 A * | 9/1998 | Schroeder | 340/467 |
| 5,818,332 A | 10/1998 | Chen | |
| 5,838,259 A * | 11/1998 | Tonkin | 340/903 |
| 6,020,814 A | 2/2000 | Robert | |
| 6,035,053 A | 3/2000 | Yoshioka et al. | |
| 6,211,780 B1 * | 4/2001 | Kashefy | 340/466 |
| 6,463,804 B2 | 10/2002 | Matsumoto et al. | |
| 6,561,030 B2 | 5/2003 | Matsumoto et al. | |

* cited by examiner

Primary Examiner—John Tweel, Jr.
(74) Attorney, Agent, or Firm—Alston & Bird LLP

(57) ABSTRACT

An initial movement indicator for a vehicle comprises at least one warning light, and a controller structured and arranged to receive a signal indicative of vehicle movement along the ground and to process said signal to determine a rate parameter that is proportional to a rate of said vehicle movement and to determine whether the vehicle is accelerating, the controller being structured and arranged to cause the at least one warning light to be illuminated if and only if the rate parameter is greater than zero but less than a predetermined value and the vehicle is accelerating.

27 Claims, 3 Drawing Sheets

INITIAL MOVEMENT INDICATOR SYSTEM AND METHOD FOR A WHEELED GROUND VEHICLE

BACKGROUND OF THE INVENTION

The present invention relates to safety and warning systems and methods for wheeled ground vehicles such as automobiles, trucks, and the like.

Statistics indicate that the side impact or "T-bone" type of collision is responsible for a substantial proportion of the serious injuries and fatalities sustained each year in traffic accidents. In a common scenario, vehicle A moves from a dead stop from a side street onto an intersecting roadway and is struck in the side by vehicle B traveling along the intersecting roadway. A common cause of such side impact collisions is simply that driver A misjudges the speed of the oncoming vehicle B, or does not see vehicle B at all. Such incidents are becoming more common as the driving population ages. Once driver A begins to enter the intersection, it is often too late for him or her to do much to avoid being struck by vehicle B because vehicle A is usually traveling at a low speed and hence has little maneuverability. Thus, if driver B is slow to see or realize that vehicle A is beginning to move into the intersection, there may be little that either driver can do to avoid a collision.

In terms of safety engineering, most efforts have tended to focus on providing protective systems such as steel beams in the doors and/or side air bags in an effort to reduce the severity of the trauma sustained by the occupants of the vehicle in a side impact crash. However, this is difficult at best because of the relatively small distance between the outer surface of the vehicle side and the occupant.

BRIEF SUMMARY OF THE INVENTION

The present invention focuses instead on avoiding side impact collisions by providing a warning to other drivers that a vehicle is beginning to move and accelerate from a dead stop or low-speed condition. This can give the driver of an oncoming vehicle additional time to react and possibly avoid a collision.

In one aspect of the invention, a method is provided for indicating initial movement of a wheeled ground vehicle from a stop or low-speed condition, comprising the steps of:
  assessing a rate parameter that is proportional to a rate of vehicle movement along the ground;
  determining whether the vehicle is accelerating; and
  if and only if the rate parameter is greater than zero but less than a predetermined value and the vehicle is accelerating, activating a warning system so as to provide an indication of initial movement of the vehicle.

Thus, the method entails activating the warning system only when the vehicle is accelerating and the vehicle speed is relatively low, thereby providing a warning only of initial movement of the vehicle. The warning system is not activated in other circumstances, such as when the vehicle is coming to a stop (i.e., decelerating rather than accelerating), even if the vehicle speed is low such that the rate parameter is less than the predetermined value. Furthermore, the warning system is not activated when the vehicle is accelerating from a relatively high-speed condition, such as when passing or overtaking another vehicle on a highway. In this manner, the invention provides a warning only for the specific circumstance of initial movement and acceleration.

In preferred embodiments of the invention, the warning system comprises one or more warning lights mounted on the vehicle so as to be visible to persons outside the vehicle. The warning lights advantageously create a highly visible light under all sorts of outside lighting and weather conditions. The lights can be continuously illuminated or can be illuminated in a flashing manner (e.g., a high-frequency strobe light). The warning lights can be mounted on opposite sides of the vehicle so as to be visible to drivers located on opposite sides of a path of travel of the vehicle, and/or can be located so that drivers in front of and behind the vehicle can see them. For instance, the warning lights can be located close to the front and rear directional or turn signals, or can even be incorporated into the same lamp assemblies with the turn signals.

In another aspect of the invention, an initial movement indicator for a vehicle comprises at least one warning light, and a controller structured and arranged to receive a signal indicative of vehicle movement along the ground and to process said signal to determine a rate parameter that is proportional to a rate of said vehicle movement and to determine whether the vehicle is accelerating, the controller being structured and arranged to cause the at least one warning light to be illuminated if and only if the rate parameter is greater than zero but less than a predetermined value and the vehicle is accelerating.

The rate parameter can be determined based on a signal from an existing vehicle sensor, such as a wheel speed sensor commonly employed in conjunction with antilock brake systems (ABS) and/or traction control systems (TCS). Such a sensor typically provides an alternating or pulsed signal whose frequency is proportional to the rotational speed of one of the vehicle wheels. The initial movement indicator thus can be added onto an existing vehicle or included as original equipment on a new vehicle without requiring a dedicated sensor for detecting vehicle movement. The controller of the initial movement indicator includes a microprocessor that can be programmed to determine the actual vehicle speed based on the sensor signal, or the rate parameter can be another quantity such as wheel rotational speed (e.g., in revolutions per minute (rpm), radians per second, or the like) or even the frequency of the signal from the sensor. Depending on what rate parameter is used, the predetermined value of the rate parameter is chosen appropriately so that the warning light is activated only when the vehicle speed is relatively low (e.g., less than 10 miles per hour).

The controller can be programmed to determine whether the vehicle is accelerating in various ways. For instance, an accelerometer or the like can be mounted in the vehicle and the signal from the accelerometer can be received by the controller and assessed to determine whether the acceleration is greater than zero. Alternatively, the controller can be programmed to determine the acceleration from the same signal used in determining the rate parameter. More particularly, the controller can determine the time rate of change of the rate parameter, which gives an indication of the vehicle acceleration. Thus, if the rate parameter is increasing in magnitude with time, then the acceleration is greater than zero; if the rate parameter is constant or decreasing with time, then the acceleration is equal to or less than zero.

In one embodiment of the invention, the controller is structured and arranged to illuminate the at least one warning light for a predetermined period of time once the controller has determined that the rate parameter is greater than zero but less than the predetermined value and the vehicle is accelerating. For instance, the warning light can be illuminated, either continuously or in a flashing manner, for a period of two seconds following a determination that the conditions for activating the light are satisfied, regardless of whether those conditions continue to be satisfied for the entire two-second period. This can be advantageous, for example, when a vehicle starting from a dead stop or low-speed condition begins to accelerate for a very brief period and then ceases to accelerate although it is still moving, or when a vehicle accelerates from a "rolling stop" and very soon surpasses the threshold speed above which the warning light would normally not be illuminated. In these types of situations, the warning light would still be illuminated for the predetermined period of time so as to provide a warning of sufficient duration to be noticed by other drivers.

The warning lights can be mounted on each of the opposite sides of the vehicle. The lights can include front warning lights for warning of initial forward movement of the vehicle and rear warning lights for warning of initial reverse movement of the vehicle. The controller can be programmed to determine whether the vehicle movement is in a forward direction or a reverse direction, and can illuminate the appropriate set of lights. The determination of direction of movement can be accomplished in various ways. As one example, the controller can receive a signal from a sensor associated with the transmission indicating whether the transmission is in a forward gear or a reverse gear, and can determine the direction of movement based on the signal. Alternatively, it may be possible to deduce the direction of wheel rotation from the signal from the wheel sensor.

The controller of the initial movement indicator can exist as a separate stand-alone unit, or can be a separate processor contained in the same housing with another processor such as an ABS controller or the like. Alternatively, the controller can comprise an existing device, such as an ABS controller or the like, that is programmed with additional logic for carrying out the steps associated with the initial movement indication function.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3:
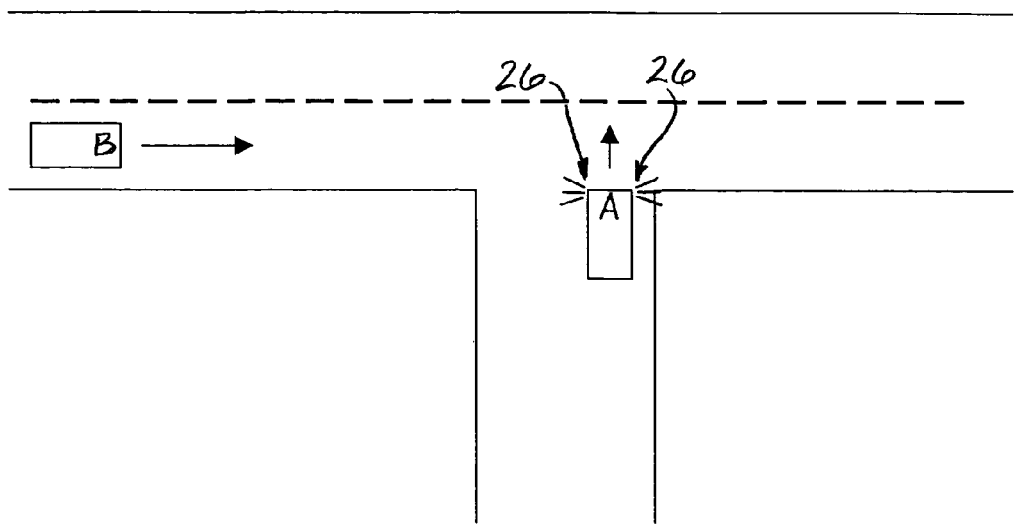
FIG. 3 shows a top elevation of a first traffic situation involving vehicle A about to enter an intersection in a forward direction into the path of vehicle B, showing front warning lights being illuminated on vehicle A to indicate initial movement of vehicle A in accordance with one embodiment of the invention.
Figure 4:
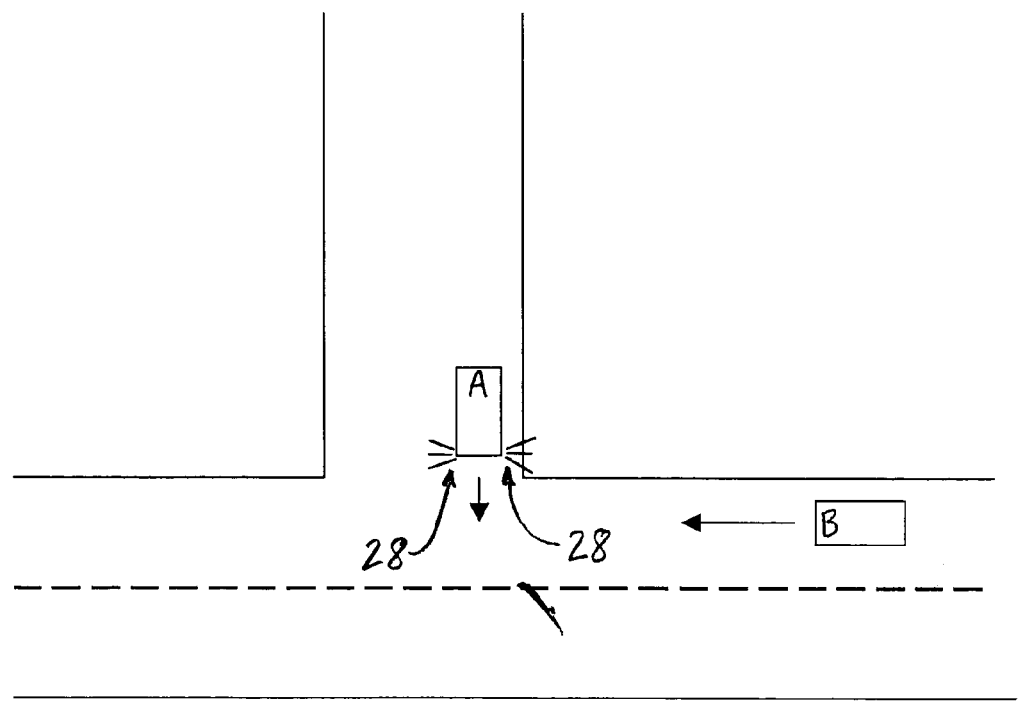
Figure 5:
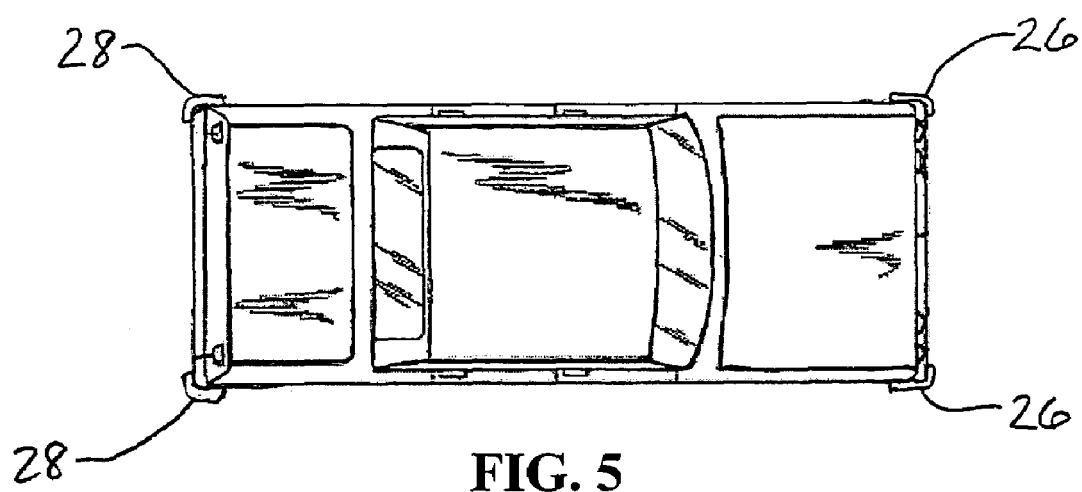

FIG. 4 is a view similar to FIG. 3, showing a second traffic situation in which vehicle A is about to reverse into an intersection into the path of vehicle B, showing rear warning lights being illuminated on vehicle A to indicate initial movement of vehicle A in accordance with one embodiment of the invention; and FIG. 5 is a top elevation of a vehicle equipped with an initial movement indicator system in accordance with the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
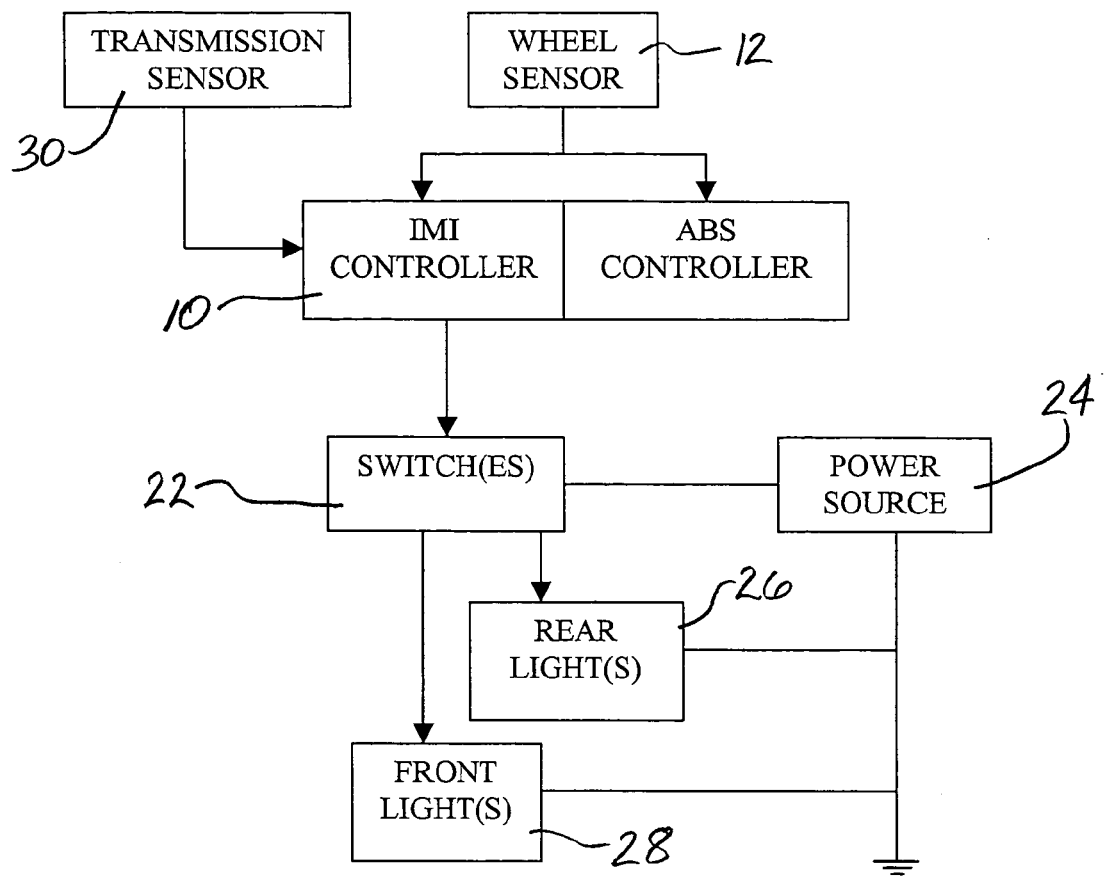
FIG. 1 is a diagrammatic depiction of an initial movement indicator system in accordance with one embodiment of the invention.
Figure 2:
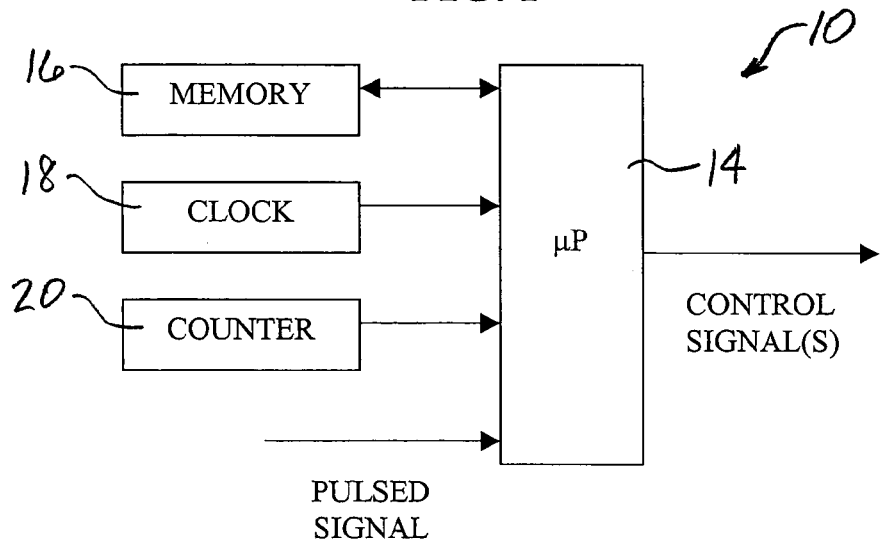
FIG. 2 is a diagrammatic view of the controller of the system of FIG. 1.

FIGS. 1 and 2 show one embodiment of an initial movement indicator system in accordance with the invention. The system includes a controller 10 that receives a signal from a wheel sensor 12. In this embodiment, the wheel sensor 12 is an existing sensor that is commonly included in the wheel bearing of one or more wheels of a vehicle that is equipped with an anti-lock brake system (ABS) and/or a traction control system (TCS), for the purpose of sensing the rotational speed of the associated wheel. For instance, the wheel sensor 12 can be a sensor of the type shown in any of U.S. Pat. No. 5,564,839 to Ouchi et al. U.S. Pat. No. 4,946,296 to Olschewski et al., or U.S. Pat. No. 4,968,156 to Hajzler, the disclosures of which are incorporated herein by reference. The sensor creates a signal of an alternating or pulsed character wherein the frequency of the alternation or pulsing is proportional to the rotational speed of the wheel. Hence, it is possible to determine the wheel rotational speed from the sensor signal in any manner known in the art.

The controller 10 is shown in greater detail in FIG. 2, illustrating one possible embodiment of the controller. The controller includes a microprocessor 14, a memory 16, a clock 18, and a counter 20. It will be recognized that the clock and/or counter can be implemented in hardware or in software programmed in the microprocessor 14, and are shown separately for purposes of explanation. The microprocessor is programmed to process the pulsed signal from the sensor 12 so as to determine a rate parameter that is indicative of the speed at which the vehicle is traveling along the ground. This may be accomplished in various ways. For instance, the microprocessor can use the counting function to count the number of pulses in the signal during a particular period of time as measured by the clock and can relate the number of pulses to the wheel rotational speed through a known relationship between the frequency of the pulsed signal and the rotational speed. At any rate, regardless of the particular method employed, the microprocessor determines a rate parameter that is related to the vehicle speed. For example, where wheel rotational speed is determined from the signal, the vehicle speed can be calculated (assuming no slippage between the tire and the ground) based on a known relationship between wheel rotational speed and vehicle speed, and the vehicle speed can be used as the rate parameter. Alternatively, the wheel rotational speed may be used directly as the rate parameter.

The microprocessor is programmed to provide a control signal to one or more normally open switches 22 that selectively supply or interrupt the supply of electrical power from a suitable power source 24 to one or more warning lights 26, 28 that are mounted on the vehicle body so as to be visible to persons outside the vehicle. In the embodiment of FIG. 1, the system includes at least one front warning light 26 located proximate a front end of the vehicle, and at least one rear warning light 28 located proximate the rear end of the vehicle. The front and rear warning lights advantageously are located in such a manner as to be visible to persons located to either side of the vehicle as well as in front of and behind the vehicle. In a preferred embodiment as shown in FIG. 5, there are two front warning lights 26 located near the opposite front corners of the vehicle, such as adjacent the conventional front turn signal lamps; likewise, there are two rear warning lights 28 located near the opposite rear corners, such as adjacent the conventional rear turn signal lamps. The warning lights can be separate from the turn signal assemblies, or alternatively can be integrated into the turn signal assemblies of the vehicle. It is even possible for each warning light to comprise a dedicated filament in a multi-filament bulb wherein other filaments serve other purposes such as signaling a turn, etc.

Based on the signal from the wheel sensor 12, or from any other suitable type of sensor providing a signal indicative of movement of the vehicle, the controller 10 controls the normally open switches 22 to close so as to cause the warning lights to be illuminated under certain defined conditions. More particularly, the controller is programmed to cause the lights to be illuminated only when (1) the rate parameter is greater than zero (indicating movement of the vehicle) but less than a predetermined value, and (2) the vehicle is accelerating. If and only if both conditions (1) and (2) are simultaneously satisfied, the controller signals the switches 22 to close so that power is supplied to one or more of the warning lights 26, 28.

The controller can determine whether the vehicle is accelerating in various ways. For instance, an accelerometer or the like (not shown) can be mounted in the vehicle and the signal from the accelerometer can be received by the controller and assessed to determine whether the acceleration is greater than zero. Alternatively, the controller can be programmed to determine the acceleration from the same signal used in determining the rate parameter. More particularly, the controller can determine the time rate of change of the rate parameter, which gives an indication of the vehicle acceleration. Thus, if the rate parameter is increasing in magnitude with time, then the acceleration is greater than zero; if the rate parameter is constant or decreasing with time, then the acceleration is equal to or less than zero.

The controller periodically samples the signal from the sensor and performs the calculations to determine the rate parameter and acceleration. Preferably, the sampling and calculations are updated many times each second. For any given calculation update, if the rate parameter is greater than zero but less than the predetermined value and the vehicle is accelerating (i.e., acceleration is greater than zero), the controller signals the switch(es) 22 to illuminate the warning light(s). The lights can be illuminated in a continuous fashion or in a flashing manner. The lights should provide a highly visible light under various outside lighting and weather conditions. The color and/or intensity of the light can be suitably selected to achieve this aim. Flashing lights can be particularly effective in drawing the attention of other drivers to the vehicle. For instance, a high-frequency strobe light may be especially suitable for the present purposes.

The controller is preferably programmed to illuminate the warning light(s) for a predetermined period of time once the controller has determined that the rate parameter is greater than zero but less than the predetermined value and the vehicle is accelerating. For instance, the warning light(s) can be illuminated, either continuously or in a flashing manner, for a period of two seconds following a determination that the conditions for activating the light are satisfied, regardless of whether those conditions continue to be satisfied for the entire two-second period. This can be advantageous, for example, when a vehicle starting from a dead stop or low-speed condition begins to accelerate for a very brief period and then ceases to accelerate although it is still moving, or when a vehicle accelerates from a "rolling stop" and very soon surpasses the threshold speed above which the warning light would normally not be illuminated. In these types of situations, the warning light would still be illuminated for the predetermined period of time so as to provide a warning of sufficient duration to be noticed by other drivers.

The controller in the system of FIG. 1 also receives a signal from a transmission sensor 30 that indicates what gear the transmission is in, and the controller is programmed to determine whether the initial vehicle movement is in a forward direction (FIG. 3) or a reverse direction (FIG. 4) based on the signal. This can enable the controller to illuminate only the front warning lights 26 when the vehicle movement is in a forward direction as in FIG. 3, or to illuminate only the rear warning lights 28 when the movement is in a reverse direction as in FIG. 4.

The initial movement indicator system and method of the invention can alert other drivers, such as the driver of vehicle B in FIGS. 3 and 4, to the fact that the vehicle equipped with the system has started to move from a stopped or low-speed condition and is picking up speed. The predetermined value for the rate parameter, above which the warning lights will not be illuminated, can be chosen so that the warning is provided only when the vehicle is traveling at a relatively low speed, such as less than 10 miles per hour, or less than 5 miles per hour. In this manner, it is assured that the warning lights will not be illuminated in situations where the warning is not particularly needed, such as when accelerating from a relatively high speed on the highway. Additionally, by adding the condition that the vehicle must be accelerating in order for the warning lights to be illuminated, it is assured that the lights will not be illuminated when the vehicle is slowing to a stop, or when the vehicle is traveling at a constant speed, even if that speed is low enough to satisfy the condition of the rate parameter being less than the predetermined value.

If desired, the controller can be programmed to illuminate the warning lights only when the acceleration is greater than a predetermined positive nonzero value, coupled with the rate parameter being greater than zero but less that a predetermined value. The controller can be programmed to illuminate the warning lights at the initial wheel movement as soon as the driver takes his or her foot off the brake. This can be advantageous particularly in the case of a vehicle equipped with an automatic transmission, wherein commonly the vehicle will begin to move forward even without any pressure on the accelerator pedal, particularly on a level or downhill grade. In this manner, an early warning can be provided before the driver presses the accelerator pedal. Alternatively, by requiring that the acceleration must exceed a certain value, which can be suitably chosen so that it would generally require at least some amount of accelerator pedal pressure to exceed that value, the system could avoid "false alarms" caused by merely releasing the brake.

On the other hand, the invention is advantageous because it does not depend on actually sensing accelerator or brake pedal pressure, position, or movement and activating the warning system based on such pressure, position, or movement. The drawback to relying on accelerator pedal pressure, position, or movement is that the warning lights would be illuminated whenever the pedal is depressed, regardless of whether the vehicle actually accelerates as a result. For instance, in the situation where a driver maintains pressure on the accelerator pedal to hold the vehicle stationary on an uphill grade, the warning lights would be illuminated if the accelerator pedal condition were the only criterion taken into account. The present invention can avoid such false alarms.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for indicating initial movement of a wheeled ground vehicle from a stop or low-speed condition, comprising the steps of:
   assessing a rate parameter that is proportional to a rate of vehicle movement along the ground;
   determining whether the vehicle is accelerating; and
   if and only if the rate parameter is greater than zero but less than a predetermined value and the vehicle is accelerating, activating a warning system so as to provide an indication of initial movement of the vehicle.

2. The method of claim 1, wherein the step of activating a warning system comprises illuminating at least one warning light located on the vehicle so as to be visible to persons outside the vehicle.

3. The method of claim 2, further comprising the step of determining whether the movement of the vehicle is in a forward direction or a reverse direction, and wherein the step of illuminating at least one warning light comprises illuminating at least one front warning light if the movement is in the forward direction and illuminating at least one rear warning light if the movement is in the reverse direction.

4. The method of claim 2, wherein the step of illuminating at least one warning light comprises illuminating a pair of warning lights respectively located on opposite sides of the vehicle.

5. The method of claim 2, wherein the step of assessing the rate parameter comprises receiving a signal from a sensor that indicates vehicle wheel rotation and determining the rate parameter based on said signal.

6. The method of claim 5, wherein said signal comprises a wheel rotational speed signal and the rate parameter is determined based on said wheel rotational speed signal.

7. The method of claim 6, wherein said wheel rotational speed signal is processed to determine whether the vehicle is accelerating.

8. The method of claim 2, wherein once it has been determined that the rate parameter is greater than zero but less than the predetermined value and the vehicle is accelerating, the at least one warning light is illuminated for a predetermined period of time.

9. The method of claim 8, wherein the at least one warning light is continuously illuminated for said predetermined period of time.

10. The method of claim 8, wherein the at least one warning light is illuminated in a flashing manner for said predetermined period of time.

11. The method of claim 1, further comprising determining a rate of acceleration of the vehicle, and wherein the warning system is activated if and only if the rate parameter is greater than zero but less than a predetermined value and the rate of acceleration is greater than a predetermined positive nonzero value.

12. An initial movement indicator for a wheeled ground vehicle, comprising:
   at least one warning light; and
   a controller structured and arranged to receive a signal indicative of vehicle movement along the ground and to process said signal to determine a rate parameter that is proportional to a rate of said vehicle movement and to determine whether the vehicle is accelerating, the controller being structured and arranged to cause the at least one warning light to be illuminated if and only if the rate parameter is greater than zero but less than a predetermined value and the vehicle is accelerating.

13. The initial movement indicator of claim 12, wherein the controller is structured and arranged to illuminate the at least one warning light for a predetermined period of time once the controller has determined that the rate parameter is greater than zero but less than the predetermined value and the vehicle is accelerating.

14. The initial movement indicator of claim 13, wherein the controller is structured and arranged to continuously illuminate the at least one warning light for said predetermined period of time.

15. The initial movement indicator of claim 13, wherein the controller is structured and arranged to illuminate the at least one warning light in a flashing manner for said predetermined period of time.

16. The initial movement indicator of claim 12, wherein the at least one warning light comprises at least one front warning light for warning of forward movement of the vehicle, and the controller is structured and arranged to determine whether the movement of the vehicle is in a forward direction and to illuminate the at least one front warning light only if the movement is in the forward direction.

17. The initial movement indicator of claim 16, wherein the controller is structured and arranged to determine based on a signal from a transmission sensor whether the vehicle is in a forward gear and to illuminate the at least one front warning light only if the vehicle is in a forward gear.

18. The initial movement indicator of claim 16, wherein the at least one warning light additionally comprises at least one rear warning light for warning of reverse movement of the vehicle, and the controller is structured and arranged to determine whether the movement of the vehicle is in a reverse direction and to illuminate the at least one rear warning light only if the movement is in the reverse direction.

19. The initial movement indicator of claim 18, wherein the controller is structured and arranged to determine based on a signal from a transmission sensor whether the vehicle is in a reverse gear and to illuminate the at least one rear warning light only if the vehicle is in a reverse gear.

20. The initial movement indicator of claim 12, wherein the at least one warning light comprises a strobe light.

21. The initial movement indicator of claim 12, wherein the at least one warning light comprises a pair of warning lights for respectively mounting on opposite sides of the vehicle.

22. An initial movement indicator for a wheeled ground vehicle, comprising:
   at least one warning light;
   means for determining a rate parameter proportional to a rate of vehicle movement along the ground;

means for determining whether the vehicle is accelerating; and means for illuminating the at least one warning light if and only if the rate parameter is greater than zero but less than a predetermined value and the vehicle is accelerating.

23. A wheeled ground vehicle, comprising:

a body mounted on a set of wheels, the body having a front end, a rear end, a left side, and a right side;

at least one warning light mounted on the body so as to be visible to persons outside the vehicle;

a sensor mounted in the vehicle and operable to create a signal indicative of vehicle movement along the ground and the rate of said vehicle movement;

a controller connected to the sensor and to the at least one warning light, the controller being structured and arranged to process said signal from the sensor to determine a rate parameter that is proportional to the rate of vehicle movement along the ground and to determine whether the vehicle is accelerating, the controller being structured and arranged to cause the at least one warning light to be illuminated if and only if the rate parameter is greater than zero but less than a predetermined value and the vehicle is accelerating.

24. The wheeled ground vehicle of claim 23, wherein the sensor is structured and arranged to detect wheel rotation and to create a signal indicative of a rate of said wheel rotation.

25. The wheeled ground vehicle of claim 23, wherein the at least one warning light comprises a first pair of warning lights respectively mounted on the left and right sides of the body of the vehicle so as to be visible to persons located on opposite sides of a path of travel of the vehicle.

26. The wheeled ground vehicle of claim 23, wherein the at least one warning light comprises at least one front warning light mounted proximate the front end of the body and at least one rear warning light mounted proximate the rear end of the body.

27. The wheeled ground vehicle of claim 26, further comprising a sensor operable to create a signal indicative of whether the vehicle movement is in a forward direction or is in a reverse direction, and wherein the controller is arranged to receive said signal indicative of whether the vehicle movement is in a forward direction or is in a reverse direction and is structured and arranged to determine whether the vehicle movement is in a forward direction or a reverse direction and to cause either the at least one front warning light or the at least one rear warning light to be illuminated depending on the direction of vehicle movement.

* * * * *